United States Patent [19]
Caminada

[11] Patent Number: 5,722,455
[45] Date of Patent: Mar. 3, 1998

[54] NOZZLE CLOSING VALVE, AS WELL AS PRESSURE ATOMIZER NOZZLE HAVING SUCH A NOZZLE CLOSING VALVE

[75] Inventor: Marcel Caminada, Niederglatt, Switzerland

[73] Assignee: Satronic AG, Dielsdorf, Switzerland

[21] Appl. No.: 641,357

[22] Filed: Apr. 30, 1996

[51] Int. Cl.$^6$ ........................................ F16K 15/00
[52] U.S. Cl. .............. 137/536; 137/859; 239/533.15; 239/570
[58] Field of Search ................ 137/859, 550, 137/536; 239/533.15, 570, 575, 571

[56] References Cited

U.S. PATENT DOCUMENTS

| | | | |
|---|---|---|---|
| 3,863,841 | 2/1975 | Berthoud | 239/266 |
| 4,660,598 | 4/1987 | Butterfield et al. | 137/510 |
| 4,883,105 | 11/1989 | Schultz | 137/859 |
| 5,002,230 | 3/1991 | Norskov et al. | 239/533.15 |
| 5,125,578 | 6/1992 | Ballu | 239/394 |
| 5,323,807 | 6/1994 | Gauld et al. | 137/543.15 |

FOREIGN PATENT DOCUMENTS

| | | |
|---|---|---|
| 0 230 150 | 7/1987 | European Pat. Off. |
| 0 433 143 | 6/1991 | European Pat. Off. |
| 0 566 855 | 10/1993 | European Pat. Off. |
| 1 577 740 | 8/1969 | France |
| 2 184 247 | 12/1973 | France |
| 33 20 270 | 3/1985 | Germany |
| 39 01 032 | 2/1990 | Germany |

*Primary Examiner*—Denise L. Ferensic
*Assistant Examiner*—Joanne Kim
*Attorney, Agent, or Firm*—Oblon, Spivak, McClelland, Maier & Neustadt, P.C.

[57] ABSTRACT

A nozzle closing valve, particularly for a pressure atomizer nozzle of an oil burner, comprises an inlet side with an inlet port and a valve seat located at the end of the inlet port, as well as a closing member, which is sealing pressed onto the valve seat by a first spring located behind the closing member and is raised from the valve seat counter to the tension of the first spring when a predetermined pressure is reached in the inlet port. A maximum sealing action is achieved in the case of easy manufacture and compact construction in that the closing member is constructed as a diaphragm, the first spring has a substantially linear spring characteristic and the first spring is housed in a spring chamber constructed as a space open on one side and whose only opening is sealingly closed by the diaphragm.

19 Claims, 3 Drawing Sheets

NOZZLE CLOSING VALVE, AS WELL AS PRESSURE ATOMIZER NOZZLE HAVING SUCH A NOZZLE CLOSING VALVE

BACKGROUND OF THE INVENTION

1. Field of the Invention

The present invention relates to the field of combustion technology. It relates to a nozzle closing valve, particularly for the pressure atomizer nozzle of an oil burner, having an inlet side with an inlet port and a valve seat located at the end of the inlet port, as well as a closing member, which is pressed by means of a first spring positioned behind the closing member in a sealing manner onto the valve seat and is raised from said valve seat counter to the tension of the first spring if a predetermined pressure is reached in the inlet port.

It also relates to a pressure atomizer nozzle for an oil burner, said nozzle having a nozzle casing, which surrounds an inner space in the form of a blind hole, said inner space in the bottom area of the blind hole being linked by a nozzle orifice to the outer space.

Such a nozzle closing valve and pressure atomizer nozzle are e.g. known from DE-A1-48 33 08 153 of the present applicant.

2. Discussion of the Background

In oil-operated heating installations, in which the heating or fuel oil to be burned is injected under a pressure of several (approximately 5) bar through a pressure atomizer nozzle into the combustion chamber where it is atomized, if no special precautions are taken, on disconnecting the burner there can be a jet-like escape or dripping of oil from the pressure atomizer nozzle. In the disconnection phase and the subsequent starting phase such a dripping leads to a fuel oil excess in the combustion chamber, which is made noticeable in the flue gas in the form of unburned hydrocarbons and significantly deteriorates the emission values of the heating installation. The same undesired effects occur if, due to a heating of the oil in the feedline to the nozzle, a volume expansion occurs, which leads to a pressure build-up in the line and to a discharge of oil from the nozzle aperture.

Thus, it has already been proposed in the aforementioned document to equip pressure atomizer nozzle of a heating installation with a closing valve which switches over automatically. Such a closing valve, which operates with a resiliently pretensioned ball as the closing member and is directly inserted in the nozzle, in the case of a marked pressure drops such as occurs on disconnection, the oil flow in the oil supply line is directly closed at the nozzle, so that the oil volumes present in the feedline between the solenoid valve and the nozzle cannot escape from the nozzle after disconnection.

In the known closing valve the valve ball, which bears directly on a metallic valve seat, is pretensioned by a diaphragm-like elastic spring, which can jump backwards and forwards between two end positions and therefore has an extremely nonlinear characteristic. When using the elastic spring it is ensured that the valve opens e.g. at an opening pressure of 7 to 9 bar, but only closes again at a closing pressure of normally 4 bar. This hysteresis in the valve behaviour has the advantage that, if the opening pressure is briefly reached on starting up the oil pump and the valve opens, subsequently injection can take place at a much lower operating pressure, so that the oil pump can be designed with a much better performance.

However, it is problematical with said known valve, that in practice an elastic spring is very difficult to manufacture with a precisely predetermined jumping characteristic, particularly as the spring only has a diameter of a few millimeters. In addition, through the cooperation of the metallic valve ball and the metallic valve seat it is difficult to achieve adequate valve sealing.

In the case of a compressed air oil atomizer nozzle a valve located in the latter has been proposed, in which the closing member is constituted by a diaphragm, which is pretensioned by a linear spiral spring (EP-A1-566 855). The spiral spring is housed in a spring chamber or space, which is admittedly sealed on one side by the diaphragm but on the other side is connected by a discharge opening to the nozzle aperture. Thus, during operation, oil can penetrate the spring chamber and, as the latter is positioned behind the valve, can pass out of the nozzle on disconnection. In practice, only little oil penetrates the spring chamber. This is linked with the fact than in the compressed air oil atomizer nozzle of EP-A1-566 855, unlike in the pressure atomizer nozzle operating without compressed air of DE-A1-33 08 153, as a result of the compressed air a suction action is produced in the vicinity of the nozzle aperture, which possibly immediately sucks off the oil entering the spring chamber.

SUMMARY OF THE INVENTION

The problem addressed in the invention is therefore to provide a valve, which on the one hand can be manufactured easily with a reproducible valve characteristic and has the desired hysteresis in the valve characteristic, and which on the other hand only has small dead spaces in which dripping oil can collect.

In the case of a valve of the aforementioned type, this problem is solved in that the closing member is constructed as a diaphragm, the first spring has a substantially linear spring characteristic and said first spring is housed in a spring chamber, which on one side is constructed as an open space, whose sole opening is sealingly closed by the diaphragm.

The elastic diaphragm, in conjunction with the metallic valve seat, leads to an excellent valve sealing. The combination of the diaphragm and linear spring, for the following reason, produces the desired hysteresis. The diaphragm seat, i.e. the marginal area on which the diaphragm rests, surrounds a much larger surface than the valve seat against which the diaphragm is pressed in sealing manner by the first spring. For as long as the valve is closed, the oil pressure sure acts on the smaller membrane surface surrounded by the valve seat. If the valve opens, the pressure acts on the larger diaphragm surface supported by the diaphragm seat. Thus, a hither force in the ratio of the two surfaces acts on the first spring, so that the diaphragm can be held with a lower pressure in the open position. The construction of the spring chamber as a space closed by the diaphragm ensures that said spring chamber is only filled with a compressible medium, but not with oil which, after the closing of the valve, could still pass out of the nozzle.

According to a preferred embodiment of the valve according to the invention, the spring chamber opening is bordered by an all-round diaphragm seat, on which the diaphragm rests with a back marginal area and that the diaphragm is pressed by means of a second spring against the diaphragm seat. This ensures that even in the case of certain unavoidable tolerances of the diaphragm and the diaphragm seat a reliable sealing action is ensured. For rendering uniform the pressure of the second spring on the diaphragm, according to a preferred further development, an intermediate ring, preferably of metal, is placed between the diaphragm and the second spring.

A second preferred embodiment of the valve according to the invention is characterized in than the first spring is constructed as a spiral spring and acts on a stud, which in turn exerts pressure on the diaphragm with one end face and that the end face of the stud is convexly shaped. The spiral spring can a simple manner be manufactured with a very precise spring characteristic. The stud with its convex end face introduces the spring tension in areal manner into the diaphragm and avoids punctiform loads, which could damage said diaphragm.

Another preferred embodiment of the valve according to the invention is characterized in that the nozzle closing valve comprises substantially rotationally symmetrical components arranged concentrically to a valve axis, said components surround a cylindrical valve box, which on one side is terminated by a filter fitted in fixed manner, whereby an inner part is inserted in the valve box containing the inlet port as a concentric through hole, is supported on the filter on the inlet side and is equipped with the valve seat on the outlet side, whereby a valve screw is screwed into the valve box which tontains the spring chamber, the diaphragm seat connected thereto and the outlet passing out laterally in front of the diaphragm seat and in the screwed in state the inner part is fixed in the valve box and the latter has an external thread with which it can be screwed into the pressure atomizer nozzle. As a result of this construction procedure the valve can be easily assembled and maintained, as well as easily fitted and removed with respect to the nozzle.

The pressure atomizer nozzle according no the invention for an oil burner having a nozzle casing, which surrounds an inner space in the form of a blind hole, said inner space In the bottom area of the blind hole being linked with the outer space by a nozzle aperture, is characterized in that a nozzle closing valve according to the invention is inserted in the inner space.

According to a preferred embodiment she nozzle closing valve is screwed into the nozzle casing and sealed with respect to said nozzle casing by a second O-ring.

Further embodiments can be gathered from the dependent claims.

BRIEF DESCRIPTION OF THE DRAWINGS

The invention is described in greater detail hereinafter relative to embodiments and the attached drawings, wherein.

DESCRIPTION OF THE PREFERRED EMBODIMENT

Figure 1:
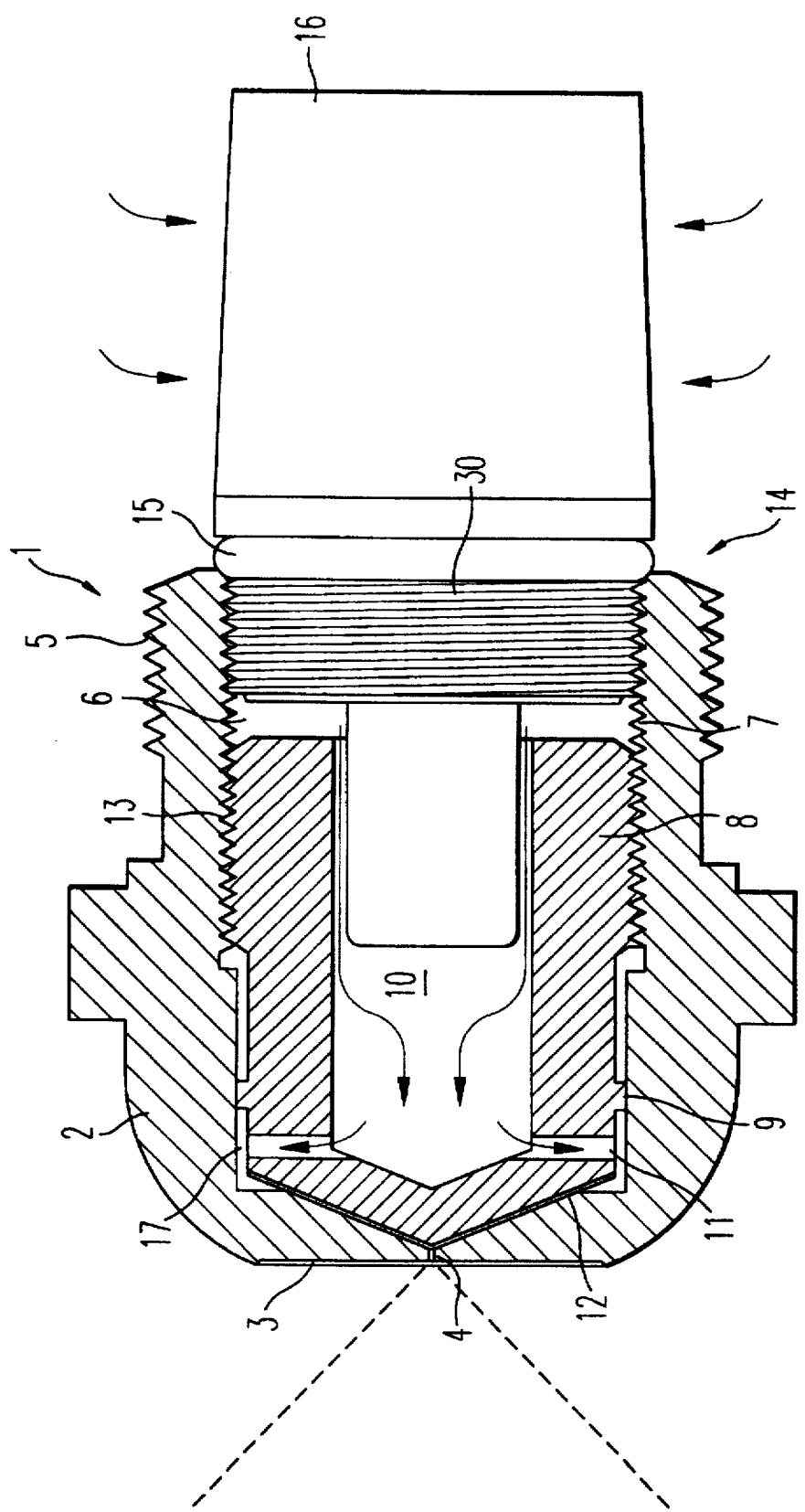
FIG. 1 shows a partial longitudinal section illustrating the installation of an exemplified valve according to the invention in a pressure atomizer nozzle.

FIG. 1 shows a preferred embodiment of a pressure atomizer nozzle with a fitted nozzle closing valve for an oil burner. The pressure atomizer nozzle 1 essentially comprises a nozzle casing 2 with a blind hole-like inner space 6. The nozzle casing 2 is flattened on the exit side with a nozzle face 3, in whose center is located a nozzle hole or aperture 4. The nozzle aperture 4 from which the oil exits at a pressure of several bar, links the inner space 6 of the nozzle with the outer space. In the inner space is inserted a cylindrical conical insert 8, whose conical tip is adapted to the hollow conical base of the inner space 6. Below the conical tip the external diameter of the conical insert 8 is reduced no a narrows annular all-round head 9, whose external diameter is adapted to the internal diameter of the inner space 6 and which takes over the function of a filter so as to prevent chips from reaching the nozzle aperture. Due to the reduced diameter an annular overflow chamber 17 is formed an the front part of the nozzle between the conical insert 8 and the wall of the inner space 6 and is worked into the tip of the conical insert 8 to which is connected the nozzle aperture.

In its interior the conical insert 8 has a blind hole 10, which extends from the rear, right-hand end Into the vicinity of the conical tip and is connected by one or more outlet ports 11 to the overflow chamber 17. The conical insert 8 carries at the rear, right-hand end an external thread 13 by means of which it can he screwed into a corresponding internal thread 7 in the inner space 6. The nozzle closing valve 10 according no the invention is positioned upstream of the conical insert. The nozzle closing valve 14, shown in side view, is also screwed by means of an external thread 30 into the nozzle casing 2 and sealed against sold casing with an O-ring 15. At the inlet side the nozzle closing valve, 14 is connected to a filter 16, which is preferably made from sintered metal. With a pin-like extension the nozzle closing valve 14 projects into the blind hole 10 of the conical insert S. The pressure atomizer nozzle 1 with the screwed in nozzle closing valve 14 can la turn be screwed by means of an external thread 5 into a non shown oil preheater or the like.

In operation, the oil entering on the right-hand side through the filter 16 into the nozzle closing valve 14 is passed, with the valve open, in the area behind the screwing in thread from an outlet not shown in FIG. 1 (24 in FIG. 2) into the inner space 6. It flows from there in the direction of the arrows through the outlet ports 14 into the overflow chamber 17 and from there via the helical grooves 12 into the nozzle orifice 4, from where it passes out in the form of an atomizing cone (shown in broken line form) into the outer space (combustion chamber).

Figure 2:
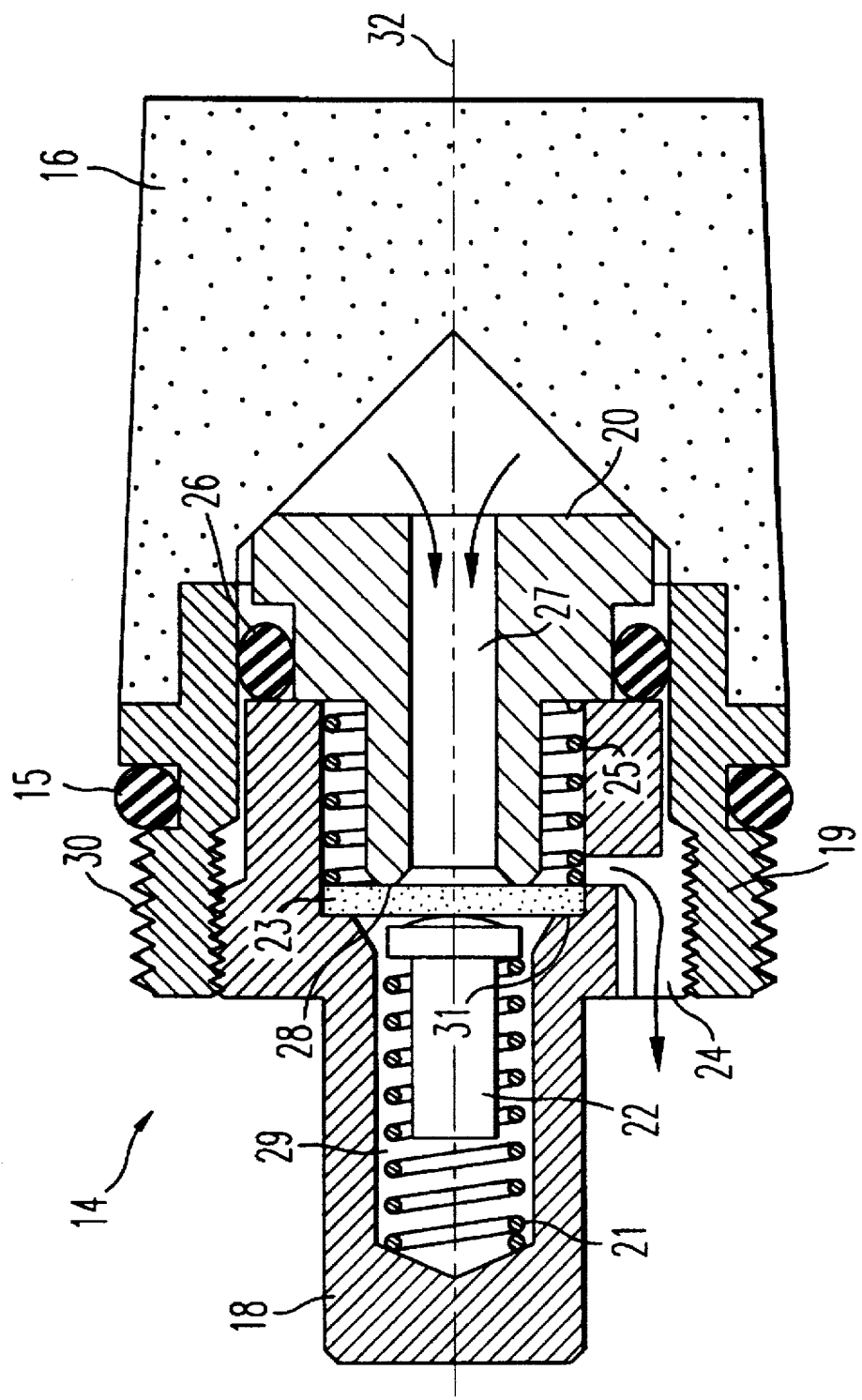
FIG. 2 shows in longitudinal section the internal structure of the valve according to FIG. 1.

The internal structure of the exemplified nozzle closing valve 14 of FIG. 1 is shown in longitudinal section in FIG. 2. The nozzle closing valve comprises rotationally symmetrical components 16, 18, 19, 20, 22, 23 arranged concentrically to a valve axis 32. The said components inter alia comprise a cylindrical rind-like valve box 19, which is terminated on one side by a fitted in fixed manner. In the valve box 19 is inserted an inner part 20, which contains an inlet port 27 in the form of a concentric through-hole. hole. The inner part 20 is supported on the inlet side on the filter 16 and is equipped on the outlet side with a valve seat 28, which surrounds in annular manner the outlet of the inlet port. Into the valve box 19 is also screwed a valve screw 15, which contains a spring chamber 29, a diaphragm seat 31 connected thereto and an outlet 24 passing out laterally upstream of the diaphragm seat 31 and In the screwed in state the inner part 20 is fixed in the valve box 19. As was mentioned hereinbefore, the valve box 19 has an external thread 30 with which it can be screwed into the pressure atomizer nozzle 1.

The closing member of the nozzle closing valve 14 is constructed as a diaphragm 23. The elastic diaphragm 23, which is inserted in the diaphragm seat 31, is pressed by means of a first spirit 21 located behind the diaphragm 23 in sealing manner onto the valve seat 28. Counter to the tension of the first spring 21, it is only raised from the valve seat 28 if a predetermined pressure, the opening pressure, is reached in the inlet port 27. The first spring 21 is preferably constructed as a spiral spring and has an essentially linear spring characteristic. It acts on a stud 22, which in turn exerts pressure on the diaphragm with a convexly shaped end face.

The first spring 21 is housed in the spring chamber 29. The spring chamber 29 is constructed as a space open at one side (blind hole), whose only opening is sealingly closed by the diaphragm 23. The spring chamber 29 contains a compressible medium which, on opening the valve, can be slightly compressed by the deforming membrane 23. As a result of its closed nature during operation no oil can penetrate it, so that it does not constitute a dead space with respect to dripping. The diaphragm 23 enrages with its back marginal area of the diaphragm seat and is pressed against the latter by means of a second spring preferably also a spiral spring. This ensures than the diaphragm 23 always sealingly engages on the diaphragm seat 31. The second spring 25 is housed in an annular hollow space, which is formed between the front, left-hand portion of the inner part 20 and the rear, right-hand portion of the valve screw 18.

Upstream of the diaphragm 23 an outlet 24 passes laterally out of the valve screw 18 and forwardly out of the valve box 19. The inner part 20 is sealed by a further O-ring 26 against the valve box 19. Coming from the right-hand side, the oil passes through the filter 16 into the inlet port 24 and from there presses on the diaphragm 23, namely on a surface bordered by the valve seat With rising pressure the diaphragm 23 blinds to the left and presses the stud to the left and compresses the first spring 21. When the opening pressure of e.g. 5 to 7 bar is reached, the diaphragm 23 rites from the valve seat 28, so that the oil can fill the space of the second spring 25. The oil now presses on a larger surface, bordered by the diaphragm seat 31, on the diaphragm, so that a lower pressure is adequate for compensating the same spring tension of the first spring 21. Therefore the oil pressure, which keeps the nozzle closing valve 14 open, is much lower than the opening pressure. With the diaphragm 23 raised, the oil flows out of the outlet 26 into the inner space 6 of the pressure atomizer nozzle 1, as has been described hereinbefore.

Figure 3:
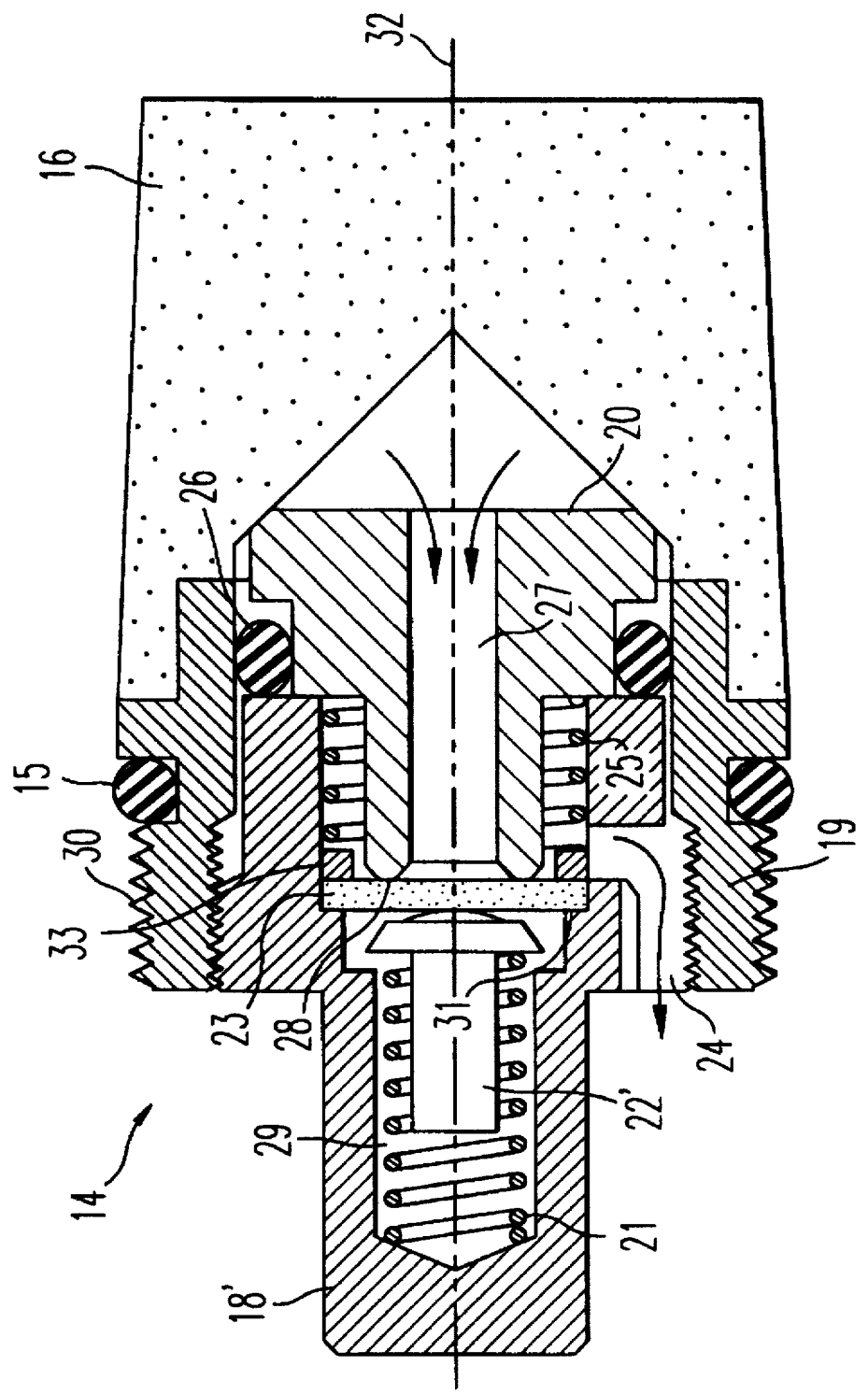
FIG. 3 shows the valve according to FIG. 2 with an additional intermediate ring between the diaphragm and she second spring and an additional path limitation of the stud.

The embodiment of the valve according to the invention shown in FIG. 3 is similar to that of FIG. 2, so that essentially the same reference numerals are used. What is different in this embodiment is that between the diaphragm 23 and the second spring 25 is located a metallic intermediate ring 33, which more uniformly distributes the pressure of the second spring 25 on the edge of the diaphragm 23 and therefore improves the seating of the diaphragm 23 In the valve and the sealing action with respect to the spring chamber 29. It is also different that the stud 22' has a larger diameter, convexly rounded head, which on forcing back the stud 22' into the valve opening direction rests on a shoulder formed in the valve screw 18' and consequently limits the displacement path of the stud 22', i.e. the valve clearance.

The nozzle closing valve 14 according to the invention forms a compact, easily disassemblable unit, which can be assembled and maintained easily. Fitting can take place with minor adaptations on all conventional nozzles, so that even existing nozzles can be easily reequipped. The desired valve characteristic can be reproducibly obtained in uncritical manner by means of the spiral spring. All conventional materials can be used and with regards to the diaphragm the necessary compressive strength and insensitivity to oil must be ensured.

LIST OF REFERENCE NUMERALS 1 pressure atomizer nozzle
2 nozzle casing
3 nozzle surface
4 nozzle aperture
5 external thread (nozzle)
6 inner space (nozzle)
7 internal thread (nozzle)
8 conical insert
9 bead
10 blind hole (conical insert)
11 outlet poet
12 helical grooves
13 external thread (conical insert)
14 nozzle closing valve
15, 26 O-ring
16 filter (sintered metal)
17 overflow chamber
18, 18' valve screw
19 valve box
20 inner pare
21, 25 spring
22, 22' stud
23 diaphragm
24 outlet
27 inlet port
28 valve sear
29 spring chamber
30 external thread (valve box)
31 diaphragm seat
32 valve axis
33 intermediate ring

I claim:

1. A nozzle closing valve for a pressure atomizer nozzle comprising:

an inlet side with a central inlet port and a valve seat located at an end of the inlet port; and a closing member, which is sealingly pressed onto the valve seat by a first spring located behind the closing member and is raised from the valve seat counter to a tension of the first spring when a predetermined pressure is reached in the inlet port;

wherein the closing member is constructed as a diaphragm, the first spring has a substantially linear spring characteristic and the first spring is housed in a spring chamber, constructed as a space open at one side and whose only opening is sealingly closed by the diaphragm.

2. A nozzle closing valve according to claim 1, wherein the opening of the spring chamber is bordered by an all-around diaphragm seat on which the diaphragm rests with its back edge area and that the diaphragm is pressed against the diaphragm seat by means of a second spring.

3. A nozzle closing valve according to claim 2, wherein an intermediate ring, is placed between the diaphragm and the second spring.

4. A nozzle closing valve according to claim 1, wherein the first spring is constructed as a spiral spring and acts on a stud which in turn exerts pressure with an end face on the diaphragm.

5. A nozzle closing valve according to claim 4, wherein an end face of the stud is convexly shaped.

6. A nozzle closing valve according to claim 4, wherein a displacement path of the stud is limited in a valve opening direction.

7. A nozzle closing valve according to claim 1, wherein a filter is positioned upstream of the inlet port.

8. A nozzle closing valve according to claim 7, wherein:
the nozzle closing valve comprises substantially rotationally symmetrical components arranged concentrically to a valve axis, the components surrounding a cylinder ring-shaped valve box, which is terminated on one side by the filter fitted in a fixed manner;

an inner part is inserted in the valve box, the inner part containing the inlet port as a concentric through hole, with an inlet side of the inner part being supported on the filter and an outlet side of the inner part being equipped with the valve seat; and a valve screw is screwed into the valve box, the valve screw containing the spring chamber, the diaphragm seat connected thereto and an outlet passing out laterally in front of the diaphragm seat, and in the screwed in state fixes the inner part in the valve box, the valve box having an external thread with which the valve box is screwed into the pressure atomizer nozzle.

9. A nozzle closing valve according to claim 8, wherein the inner part is sealed with respect to the valve box by an first O-ring.

10. A pressure atomizer nozzle for an oil burner, said pressure atomizer nozzle having a nozzle casing, which surrounds an inner space in the form of a blind hole, said inner space in a bottom area of the blind hole being connected by a nozzle aperture to an outer space, wherein the nozzle closing valve according to claim 1 is inserted in the inner space.

11. A pressure atomizer nozzle according to claim 10, wherein the nozzle closing valve is screwed into the nozzle casing and is sealed with respect to the nozzle casing by an O-ring.

12. A pressure atomizer nozzle according to claim 10, wherein a conical insert is positioned between the nozzle closing valve and the nozzle aperture in the inner space of the nozzle casing.

13. A nozzle closing valve according to claim 3, wherein said intermediate ring is made of metal.

14. A nozzle closing valve according to claim 7, wherein said filter is of sintered metal.

15. A nozzle closing valve for a pressure atomizer nozzle comprising:

an inlet side with an inlet port and a valve seat located at an end of the inlet port; and a closing member, which is sealingly pressed onto the valve seat by a first spring located behind the closing member and is raised from the valve seat counter to a tension of the first spring when a predetermined pressure is reached in the inlet port;

wherein:

the closing member is constructed as a diaphragm, the first spring has a substantially linear spring characteristic and the first spring is housed in a spring chamber, constructed as a space open at one side and whose only opening is sealingly closed by the diaphragm; and the opening of the spring chamber is bordered by an all-around diaphragm seat on which the diaphragm rests with its back edge area and the diaphragm is pressed against the diaphragm seat by means of a second spring.

16. A nozzle closing valve according to claim 15, wherein an intermediate ring is placed between the diaphragm and the second spring.

17. A nozzle closing valve according to claim 16, wherein said intermediate ring is made of metal.

18. A nozzle closing valve for a pressure atomizer nozzle comprising:

an inlet side with an inlet port and a valve seat located at an end of the inlet port; and a closing member, which is sealingly pressed onto the valve seat by a first spring located behind the closing member and is raised from the valve seat counter to a tension of the first spring when a predetermined pressure is reached in the inlet port;

wherein:

a filter is positioned upstream of the inlet port;

the nozzle closing valve comprises substantially rotationally symmetrical components arranged concentrically to a valve axis, the components surrounding a cylinder ring-shaped valve box, which is terminated on one side by the filter fitted in fixed manner;

an inner part is inserted in the valve box, the inner part containing the inlet port as a concentric through hole, with an inlet side of the inner part being supported on the filter and an outlet side of the inner part being equipped with the valve seat; and a valve screw is screwed into the valve box, the valve screw containing the spring chamber, a diaphragm seat connected thereto and an outlet passing out laterally in front of the diaphragm seat, and in the screwed in state fixes the inner part in the valve box, the valve box having an external thread with which it is screwed into the pressure atomizer nozzle.

19. A nozzle closing valve according to claim 18, wherein the inner part is sealed with respect to the valve box by an O-ring.

* * * * *